United States Patent [19]

Novak

[11] 4,046,163

[45] Sept. 6, 1977

[54] RELIEF VALVE

[75] Inventor: Thomas A. Novak, Durham, N.C.

[73] Assignee: Eaton Corporation, Cleveland, Ohio

[21] Appl. No.: 748,618

[22] Filed: Dec. 8, 1976

Related U.S. Application Data

[63] Continuation of Ser. No. 610,796, Sept. 5, 1975, abandoned.

[51] Int. Cl.² .............................................. F16K 24/04
[52] U.S. Cl. .................................. 137/512.3; 137/469; 137/512.5; 137/513; 137/614.2
[58] Field of Search .................. 137/512.3, 512.5, 513, 137/614.18, 614.2, 800, 854, 469, 542

[56] References Cited

U.S. PATENT DOCUMENTS

| 2,747,609 | 5/1956 | Sekera | 137/854 X |
| 3,542,063 | 11/1970 | Etter et al. | 137/513 X |

Primary Examiner—Alan Cohan
Assistant Examiner—Gerald A. Michalsky
Attorney, Agent, or Firm—Teagno & Toddy

[57] ABSTRACT

An improved pressure relief valve for tubeless tires or the like is provided. The pressure relief valve includes a novel poppet valve dust cover structure which will automatically reposition the dust cover after each opening or cycle of the relief valve and which will allow the dust cover to act as a secondary poppet valve surface during venting of the pressurized container in which the valve is mounted to increase the rate of fluid flow through the valve. The valve is designed to be sealingly mounted in an aperture in a wall of the pressurized container and may be mounted therein by means of a threaded connection, a clamp connection, a snap-in connection from the interior of the container or a push-in connection from the exterior of the container. The dust cover is attached to the main poppet valve member for axial movement therewith.

16 Claims, 5 Drawing Figures

RELIEF VALVE

This is a continuation of application Ser. No. 610,796, filed Sept. 5, 1975, now abandoned.

BACKGROUND OF THE INVENTION

This invention relates to pressure relief valves and more particularly relates to pressure relief valves for tubeless tires or the like having dust covers.

DESCRIPTION OF THE PRIOR ART

Pressure relief valves for venting pressurized containers, such as tubeless tires, to control the maximum pressure therein are well known in the prior art. Examples of such valves may be seen by reference to U.S. Pat. Nos. 1,722,107; 2,587,973 and 3,454,033.

The earlier prior art pressure relief valves were not totally satisfactory as they tended to close or become only partially open when pressure within the container approached the predetermined maximum pressure which decreased the rate of fluid flow through the valve thus slowing the venting operation and/or they tended to become clogged and/or inoperative with mud, moisture and/or dust.

Later prior art pressure relief valves utilized dust covers to prevent clogging of the valves with mud and/or dust and also for preventing moisture from entering the valve. The dust covers utilized were not totally satisfactory as they were rubber flaps which tended to be easily dislodged and required manual resetting and/or were plugs that were blown off the valve when the valve was open.

The prior art valves were also less than totally satisfactory as they were mounted in an aperture in a wall of the container, such as an aperture in a tubeless tire rim, by means of threaded clamping or being snapped-in from the interior of the container. Such prior art mounting methods may be drawbacks as they may be time consuming and expensive.

SUMMARY OF THE INVENTION

In accordance with the present invention many of the drawbacks of the prior art have been overcome by the provision of a pressure relief valve which includes a dust cover automatically repositioned after each relief cycle and which acts as a secondary poppet valve surface when the valve is open to maintain the valve open for more rapid venting of an over pressurized container. The valve may be conventionally sealingly mounted in an aperture in the wall of the container or may be pushed in from the exterior of the container.

The above is accomplished by providing a pressure relief valve having a valve body for being sealingly mounted in an aperture in the wall of a pressurized container. The valve body has a generally axially extending passage therethrough. Fluid flow through the valve is controlled by a spring biased, normally closed, axially movable poppet valve which will allow fluid to flow through the passage and out of the container when the fluid pressure acting on poppet valve overcomes the spring bias. A dust cover, or dust seal, covers the exterior opening to the passage. The dust cover is relatively rigidly connected to the poppet valve for axial movement therewith and fluid flowing through the passage and out of the exterior opening thereto will tend to impinge on the inner surface of the dust cover creating an additional force acting against the spring bias to tend to maintain the poppet valve in a full open condition.

The valve body may include conventional mounting means or may include means allowing the body to be sealingly mounted in the aperture by insertion into the aperture from the exterior of the container. Accordingly, it is an object of the present invention to provide a new and improved pressure relief valve having an improved dust cover.

Another object of the present invention is to provide a new and improved pressure relief valve having an improved dust cover which will be automatically repositioned after each opening of the valve and which will tend to retain the valve in the open position when greater than predetermined maximum pressure is in the container in which the valve is mounted for more rapid venting thereof.

A further object of the present invention is to provide a new and improved pressure relief valve having an improved dust cover and an improved valve body allowing the valve to be sealingly mounted in an aperture in the wall of a pressurized container by insertion from the exterior thereof.

These and other objects and advantages of the present invention will become apparent from a reading of the detailed description of the preferred embodiment taken in connection with the attached drawings.

BRIEF DESCRIPTION OF THE DRAWINGS

FIG. 2 is a front elevational view in section of the pressure relief valve of FIG. 1 as mounted in an aperture in a tubeless tire rim or the like.

DESCRIPTION OF THE PREFERRED EMBODIMENT

The improved pressure relief valve 10 of the present invention may be seen by reference to the FIGURES. The valve 10 is designed to be sealingly mounted in an aperture 14 in the wall 12 of a pressurized container as is illustrated if FIGS. 2 and 3.

The valve 10 is designed to open and allow pressurized fluid to flow out of the pressurized interior of the container when the pressure in the container exceeds a predetermined maximum. The valve 10 is designed to close when the interior of the container is at a pressure equal to or less than the predetermined maximum pressure. For purposes of illustration, the valve 10 will be discussed in terms of an automotive tire pressure relief valve mounted in an aperture in a tubeless tire rim to control the maximum pressure is said tire. It is understood that the pressure relief valve of the present invention is suitable for uses with various pressurized containers other than tubeless tires and the like.

Figure 4:
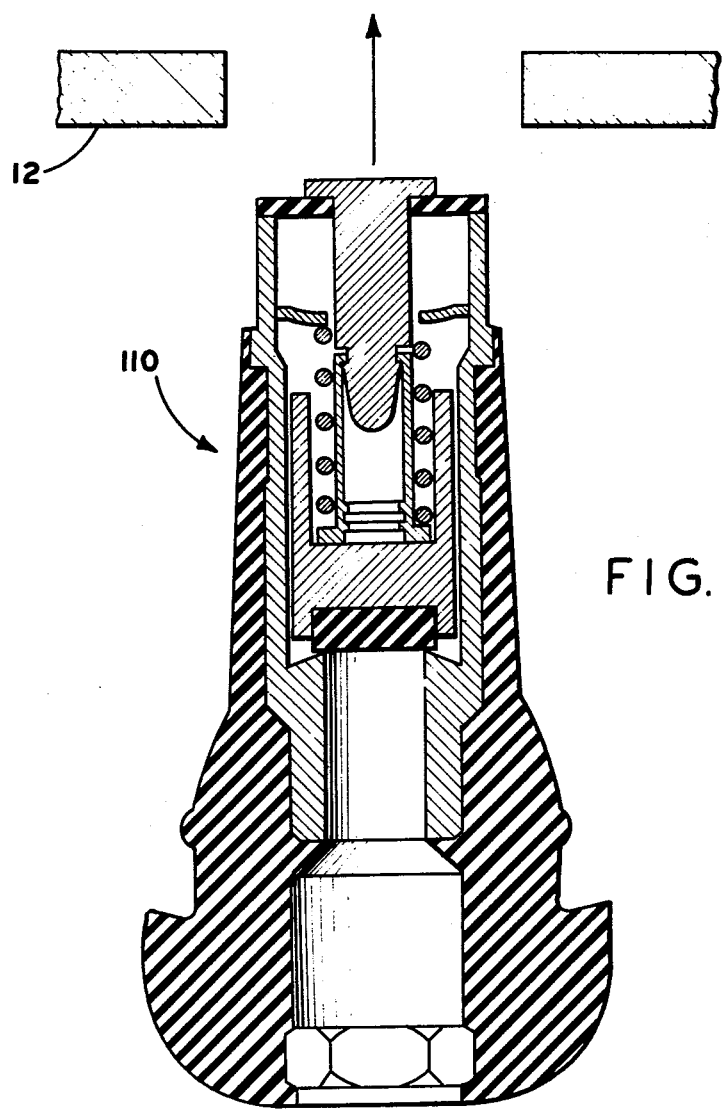
FIG. 4 is a front elevational view in section of the valve of the present invention in the embodiment of a snap-in valve.
Figure 5:
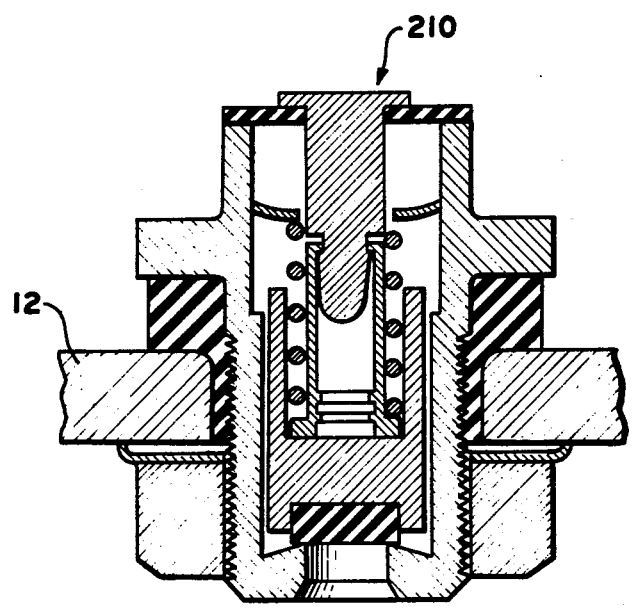
FIG. 5 is a front elevational view in section of the valve of the present invention in the embodiment of a clamp-in valve.

The valve 10 comprises a valve body 29 designed to be sealingly mounted in an aperture 14 in the wall or rim 12 of a pressurized container such as a tubeless tire rim or the like. The valve body 20 is designed for mounting from the exterior of the container by forcible insertion of the valve body 20 into the aperture 14 as will be described in detail below. It is understood that the pressure relief valve of the present invention may also be sealingly mounted in an aperture by threaded clamping such as is seen in U.S. Pat. No. 2,744,559; by being snapped-in from the interior of the container such as is seen in U.S. Pat. No. 2,818,101 or other commonly used valve mounting techniques. Examples of such snap-in or clamping embodiments are illustrated in FIGS. 4 and 5 respectively.

The valve body 20 illustrated is preferably of rubber or of an equivalent flexible elastic material. A hollow insert 40 is secured within the body 20 by known means, such as bonding. The hollow insert is preferably of a metal, such as steel or brass, which adheres to rubber. The relief valve insides, or core 60, is received within the valve insert 40.

The valve body comprises a lower end 22 for insertion into the aperture 14 in the wall 12 of the pressurized container which is radially outwardly tapered as at 24. The terms upper, lower, top, bottom, etc., are used for illustrative purposes and refer to the drawings. The terms are not intended to be limiting upon the scope of the present invention. The tapered portion 24 extends upwardly from the leading edge 23 to a first shoulder 26, which in combination with the enlarged bulbous upper flange 28 defines a groove 30 therebetween. The leading edge 23 of the lower end 22 of the valve body is of a smaller diameter than the aperture 14 while the first shoulder 26 is of a substantially larger diameter than the aperture 14. The groove 30 includes an axially extending, annular bottom wall 32 extending between shoulder 26 and flange 28 which is of a diameter somewhat larger than the diameter of the aperture 14 in which the valve 10 is to be sealingly mounted but somewhat smaller diameter than the outer diameter of shoulder 26 or flange 28. An axially extending annular cavity 34 separates the valve body 20 from the valve insert 40 axially coincident with the groove 30 and the shoulder 26 allowing the valve body to be radially inwardly deformed for mounting purposes. Axial stretching of the shoulder 26 during the installation also results in a smaller diameter of the shoulder making the shoulder easier to force into the aperture.

Figure 1:
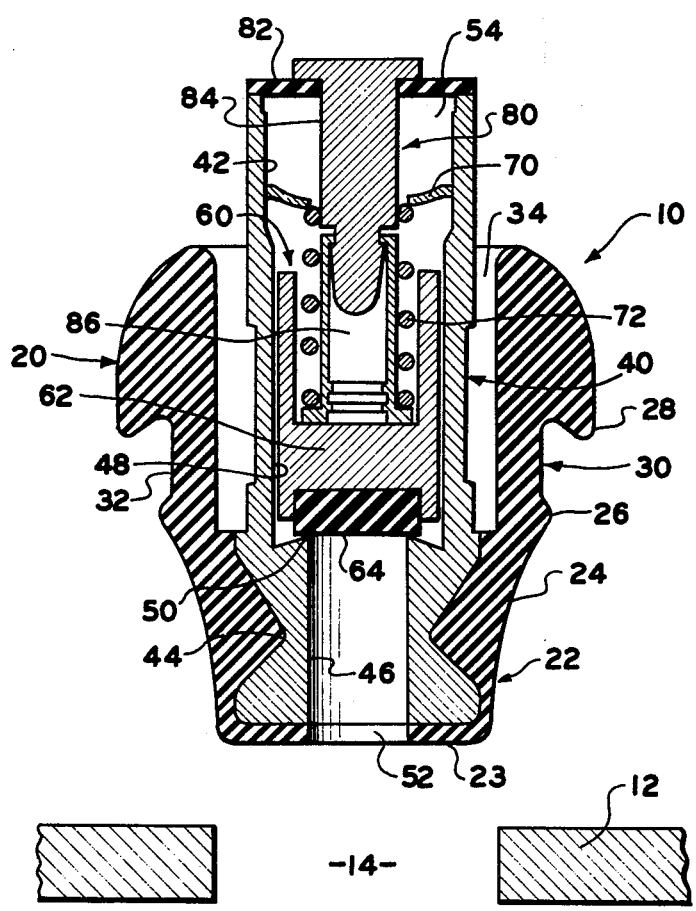
FIG. 1 is a front elevational view in section of one embodiment of the present invention.
Figure 2:
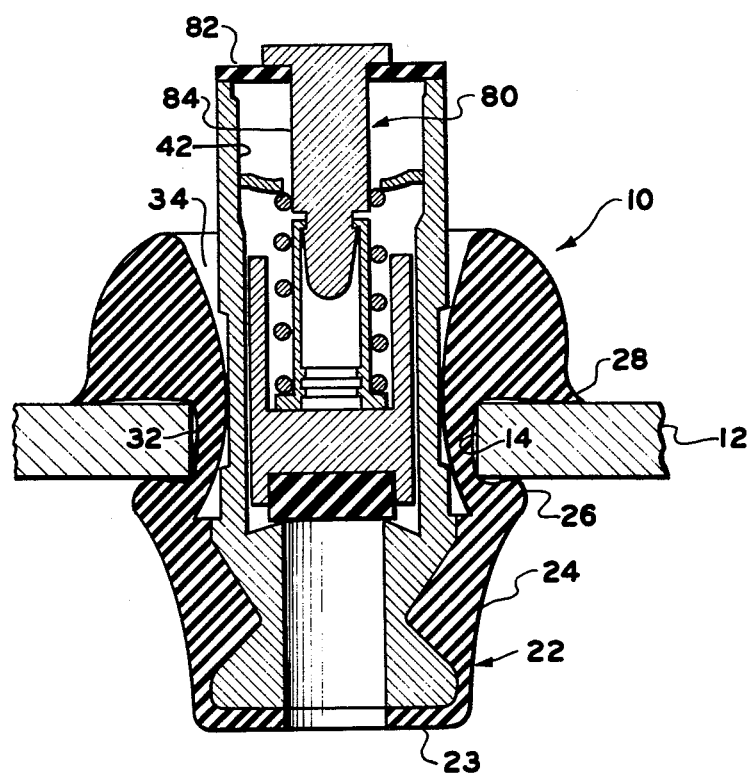
Figure 3:
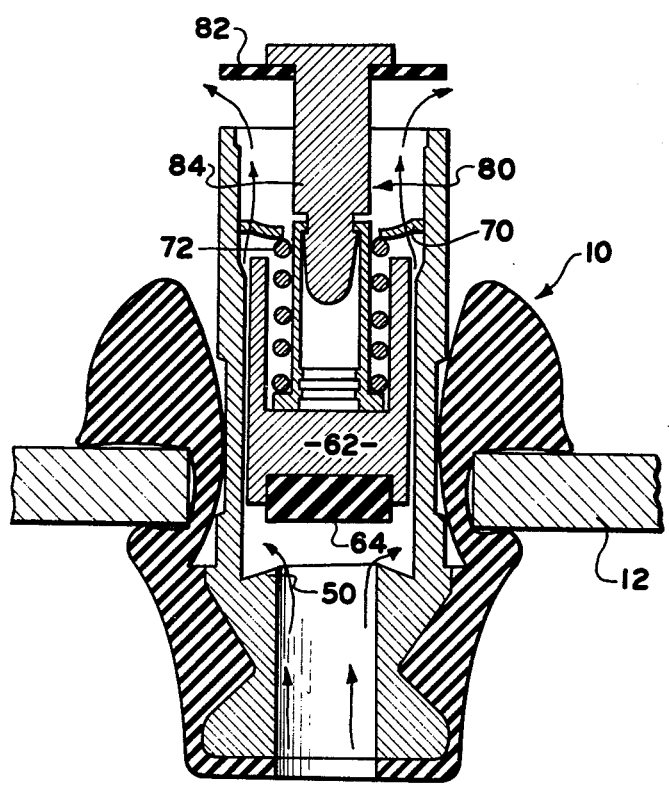
FIG. 3 is a front elevational view in section of the valve of FIG. 2 in the open or venting condition.

As may be seen from FIGS. 1 and 2, when the valve body 20 is forcibly inserted, leading edge 23 of lower end 22 first, into the aperture 14, the sides of the wall defining the aperture will engage the tapered portion 24 and then the first shoulder 26, causing the valve body to inwardly deform into cavity 34 as the tapered portion 24 and then the shoulder 26 pass through the aperture 14 until the walls defining the aperture 14 are snapped into the groove 30. The valve 10 as sealingly mounted in aperture 14 may be seen be reference to FIG. 2. The bulbulous flange 28 is of such diameter to prevent passage thereof through the aperture and generally radially extending, annular surface 29 will define the maximum axial penetration of the valve body 20 into the aperture 14.

The hollow valve insert 40 defines an axially extending passage 42 through the valve 10. In the mounted position of the valve 10, the passage 42 extends from the interior to the exterior of the pressurized container. The insert may include various exterior configurations such as V-shaped slot 44 for enhancing the bonding retention between the valve body and the insert. The passage 42 includes a smaller diameter portion 46 at the lower or interior end thereof and a larger diameter portion 48 at the upper or exterior end thereof which meet at a shoulder 50 which defines a valve seat. The passage 42 includes an inlet 52 at the outer end of the smaller diameter portion 46 and an outlet 54 at outer opening to the larger diameter portion 48.

Slidably received within the larger diameter portion 48 of passage 42 is poppet valve member 62 which carries a seal member 64 for sealing engagement with the valve seat 50 to block fluid flow through the passage 42. The poppet valve member 62 is the form of a generally cylindrical member which is of smaller diameter than the larger diameter portion 48 of passage 42 allowing fluid to flow around the poppet member 62 and out of the outlet 54 when the seal 64 is not in sealing contact with the valve seat 50.

Located in and axially fixed to the passage 42 adjacent the outlet 54 is a hollow, washer type member 70 which acts as a spring seat for the coil spring 72 which acts on the upper end of poppet valve member 62 to bias the poppet valve member towards the valve seat 50. Spring seat 70 could, of course, be threadably engaged to the insert 40 for selectively adjusting the biasing force applied by spring 72 to poppet valve member 62. The spring constant of compressed spring 72 is selected to supply a force to the poppet valve member equal to the predetermined maximum pressure in the container acting on the exposed surface of the sealing member 64.

The above defined poppet valve and valve seat structure is known in the art and other functionally equivalent structures may be substituted therefor.

Extending through the opening in the spring seat member 70 is an axially extending stem 80 which extends from the poppet 62 to the dirt, dust and/or moisture seal/cover 82. The seal/cover 82 is a generally annular disc which is of sufficient diameter to cover the opening 54 to the passage 42. The seal/cover may be of a metal, plastic, rubber or a combination thereof. The material selected should be somewhat deformable to provide a good sealing contact between the seal/cover and the outlet 54 to prevent the entry of mud, dirt, dust and/or moisture into the relief valve. The seal/cover 82 is coaxial with and exterior to the large diameter portion 48 of passage 42.

The axially extending stem 80 may be of two or more portions, such as 84 and 86, to compensate for slight misalignments and the like. The stem 80 relatively rigidly axially connects the poppet 62 with the dust seal/cover 82 for joint axial movement. The seal/cover 82 is axially spaced from the seal 64 such that the seal/cover 82 will engage the outlet 54 when the seal 64 engages the valve seat 50. The stem 80 may be permanently or adjustably mounted to the poppet member 62 and the seal/cover 82 by various known means.

In operation, the relief valve and seal/cover structure of the present invention provides two advantages over the known prior art.

The seal/cover is coaxial with passage 42 and outlet 54 and will move in axial unison with the poppet 64 and will thus automatically be repositioned in sealing contact with the outlet 54 when the poppet valve member seal 64 engages valve seat 50 closing the pressure relief valve 10. The seal/cover will also automatically uncover outlet 54 when the poppet valve member 62 moves axially away from seat 50 to allow fluid flow through the valve.

When pressure within the pressurized container is sufficient to move the poppet valve member 62 upward against the force of spring 72 to open the valve (see FIG. 3), air entering the inlet 52, escaping past the valve seat 50, around the poppet member 62 and out of the outlet 54 will tend to impinge on or act against the lower surface of the seal/cover 82. It is noted that the lower surface of seal/cover 82 will remain generally perpendicular to the axis of the poppet valve member 62 by virtue of the relatively rigid connection between stem 80 and seal/cover 82. The force of the escaping pressurized air will create a force on the poppet member 62 which will be additive with the force of pressurized fluid on seal 64 to move the poppet against the bias of spring 72. The additive force of escaping pressurized air acting on the under surface of seal/cover 82 which will tend to retain the valve 10 in the fully open condition for rapid venting of the pressurized container.

Although this invention has been described in its preferred form with a certain degree of particularity, it is understood that the present disclosure has been made only by way of example and that various changes in the details of construction and combination and arrangement of the parts may be resorted to without departing from the spirit and the scope of the invention as hereinafter claimed.

I claim:

1. A pressure relief valve for maintaining the pressure within a pressurized container no greater than a predetermined maximum pressure, said valve comprising:
    a valve body adapted to be sealingly mounted in an aperture in a wall of said pressurized container, said valve body having an axially extending passage therethrough, said passage having an inlet for fluid communication with the interior of the pressurized container and an outlet for fluid communication with the exterior of the container, said passage defining a valve seat interposed between said inlet and said outlet;
    an axially movable poppet member slidably received in said passage interposed between said valve seat and said outlet, said poppet member having a surface for sealing contact with said valve seat to prevent fluid flow through said passage;
    means for biasing said poppet member toward said valve seat;
    a valve stem extending from said poppet member towards said outlet, said stem attached to said poppet member for axial movement therewith; and
    a cover member exterior of said valve body and attached to said valve stem causing said cover member to move axially therewith and preventing relative axial movement therebetween, said cover member being sufficiently large to cover said outlet, said cover member being axially spaced from said poppet member such that said cover member will contact said outlet when the poppet member surface sealingly contacts said valve seat, said cover being formed of resilient material such that said cover member is axially flexible in the regions adjacent the outer periphery thereof.

2. The pressure relief valve of claim 1 wherein said cover member includes a cover surface for engagement with said outlet, said cover member being generally rigidly mounted to said stem to maintain said cover surface generally perpendicular to the axis of said passage.

3. The valve of claim 2 wherein said cover member is a substantially disc shaped device coaxial with and exterior to said passage.

4. The device of claim 2 wherein said stem is a multiple piece structure.

5. The device of claim 2 wherein said passage comprises a larger diameter portion adjacent said outlet and a smaller diameter portion adjacent said inlet, said valve seat defined by the intersection of said larger and smaller diameter portions.

6. The valve of claim 5 wherein said biasing means is a spring, one end of said spring seated against the poppet member and the other end of said spring seated against a hollow spring seat fixed in said larger diameter portion adjacent the outlet, said stem passing through said hollow spring seat.

7. The valve of claim 6 wherein said spring seat comprises a washer like member embedded in the larger diameter portion of said passage.

8. The valve of claim 6 wherein said valve body is adapted to be sealingly mounted in said aperture by insertion into said aperture from the exterior of said pressurized container.

9. The valve of claim 8 wherein said molded rubber body comprises a leading edge for insertion into the aperture, a tapered surface extending radially outwardly from the leading edge to a radially outwardly protruding shoulder and an annular groove defined between the should and an enlarged bulbous flange on the end of the molded rubber body opposite the leading edge, said inlet being adjacent the leading edge and said outlet being adjacent the bulbous flange, said groove including an axially extending surface generally parallel to the axis of the passage and extending from the shoulder to the flange, said leading edge being of lesser outer diameter than the diameter of said aperture, said should being of considerably larger outer diameter than the diameter of said aperture and said axially extending surface being of an outer diameter greater than the diameter of the shoulder and smaller than the outer diameter of the flange.

10. The valve of claim 9 wherein said valve body comprises an axially extending annular cavity between said insert and said molded rubber body adjacent said outlet, said cavity extending axially coincident with said shoulder and said groove.

11. The valve of claim 10 wherein said cavity is coaxial with said insert, opens to said flange and extends to a point axially interposed between said shoulder and said leading edge.

12. The valve of claim 11 wherein said insert is brass and includes a generally V-shaped depression on the exterior surface thereof adjacent said inlet.

13. The valve of claim 8 wherein said valve body is a snap-in valve body.

14. A pressure relief valve comprising a body mountable to a pressurized container, said body defining an axially extending passage therethrough having an inlet in fluid communication with the interior of the container and an outlet, said passage having a valve seat intermediate said inlet and said outlet, a poppet slidably mounted in said passage, said poppet having a surface biased to normally contact said valve seat to block the flow of fluid through said passage, and a cover member exterior of and coaxial with the outlet, said cover member generally rigidly mounted to said poppet causing said cover member to move axially therewith and preventing relative axial movement therebetween, said cover member axially spaced from the surface of said poppet designed to contact said valve seat by a distance substantially equal to the separation of said valve seat and said outlet, said cover being formed of resilient material such that said cover member is axially flexible in the regions adjacent the outer periphery thereof.

15. The pressure relief valve of claim 14 wherein said body comprises an exterior rubber portion and an axially extending hollow insert bonded to said exterior rubber portion, said passage comprising a larger diameter portion adjacent the outlet and a smaller diameter portion adjacent the inlet, said valve seat defined by the intersection of said larger and smaller diameter portions, said poppet slidably mounted in said larger diameter portion.

16. The valve of claim 15 wherein said poppet is biased towards said valve seat by a compressed spring extending between said poppet and a generally washer shaped spring seat axially fixed in said larger diameter portion of said passage adjacent the outlet, said stem extending through the central aperture in said washer shaped spring seat.

* * * * *

UNITED STATES PATENT AND TRADEMARK OFFICE
CERTIFICATE OF CORRECTION

PATENT NO. : 4,046,163
DATED : Sept. 6, 1977
INVENTOR(S) : Thomas A. Novak

It is certified that error appears in the above-identified patent and that said Letters Patent are hereby corrected as shown below:

| | |
|---|---|
| Col. 2, line 58: | "is" should be "in". |
| line 62: | "29" should read "20". |
| Col. 3, line 53: | "bulbous" is misspelled. |
| Col. 6, line 24: | "should" should read "shoulder". |
| line 32: | "should" should read "shoulder". |

Signed and Sealed this

Sixth Day of December 1977

[SEAL]

Attest:

RUTH C. MASON
*Attesting Officer*

LUTRELLE F. PARKER
*Acting Commissioner of Patents and Trademarks*